W. F. BEATON.
MILK BOTTLE HOLDER.
APPLICATION FILED OCT. 2, 1912.

1,064,698.

Patented June 17, 1913.
2 SHEETS—SHEET 1.

WITNESSES:
Rob't R. Kitchel.
Frank E. French.

INVENTOR
William F. Beaton
BY
Augustus B. Stoughton
ATTORNEY.

W. F. BEATON.
MILK BOTTLE HOLDER.
APPLICATION FILED OCT. 2, 1912.

1,064,698.

Patented June 17, 1913.

2 SHEETS—SHEET 2.

WITNESSES:

INVENTOR
William F. Beaton
BY
Augustus B Stoughton
ATTORNEY.

UNITED STATES PATENT OFFICE.

WILLIAM F. BEATON, OF PHILADELPHIA, PENNSYLVANIA.

MILK-BOTTLE HOLDER.

1,064,698.

Specification of Letters Patent.   Patented June 17, 1913.

Application filed October 2, 1912.   Serial No. 723,638.

*To all whom it may concern:*

Be it known that I, WILLIAM F. BEATON, a citizen of the United States, residing at the city of Philadelphia, in the county of Philadelphia and State of Pennsylvania, have invented a certain new and useful Milk-Bottle Holder, of which the following is a specification.

Objects of the present invention are to insure the delivery of milk bottles to the customers and to prevent the theft or appropriation of the bottles by others; to insure the reception of the bottles by the customers with the contents in the same condition in which it was delivered and without being tampered with by unauthorized persons; and to facilitate the delivery of milk bottles and prevent confusion in delivery especially in apartment houses and other places where tenants are being served.

To this and other ends hereinafter set forth and stated in general terms the invention comprises a housing having an opening for the insertion and removal of a flanged milk bottle neck and provided with movable jaws for receiving and automatically holding the neck and with means for permitting authorized persons to release the jaws and remove the bottle.

For the sake of description one, but not the only, embodiment of the invention is illustrated in the accompanying drawings in which—

Figure 1:
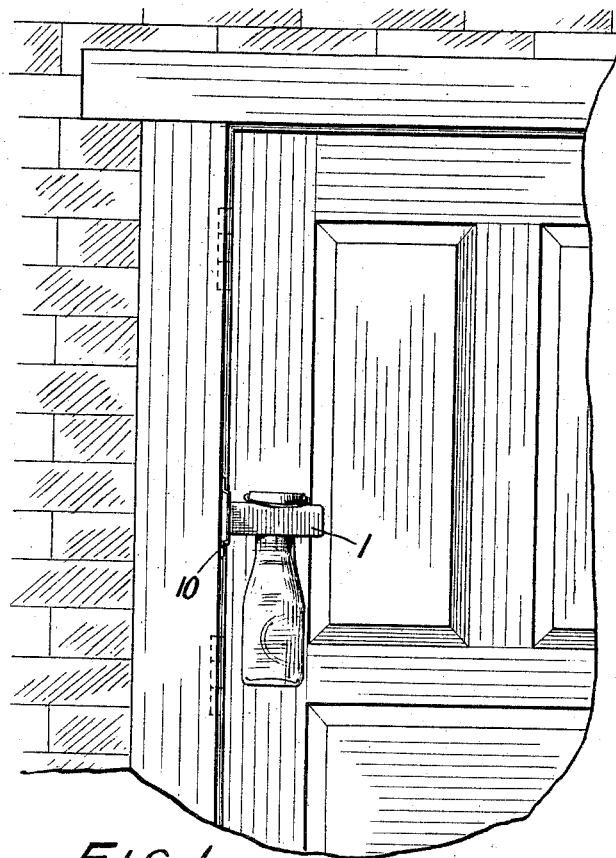
Figure 2:
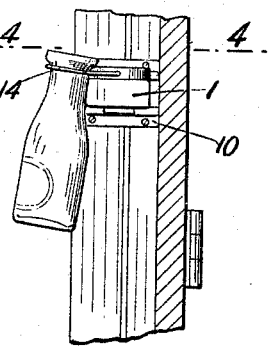
Figure 3:
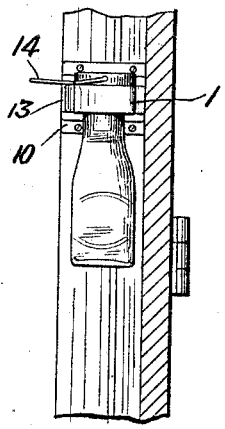
Figure 4:
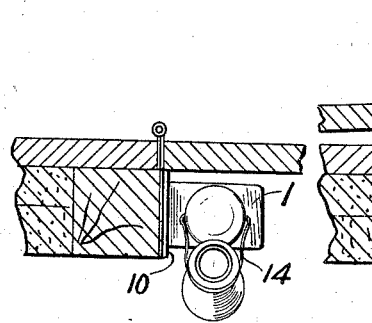
Figure 5:
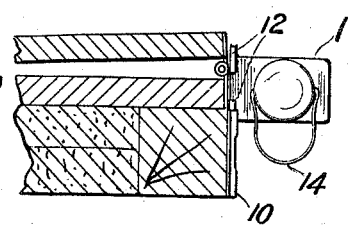
Figure 6:
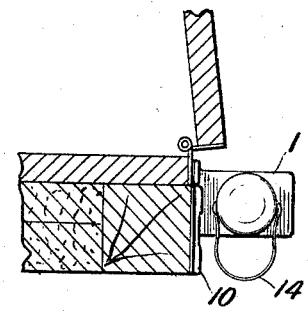
Figure 7:
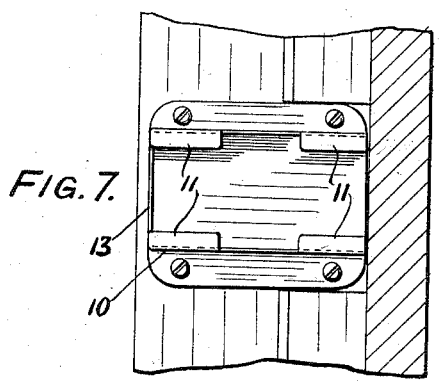
Figure 8:
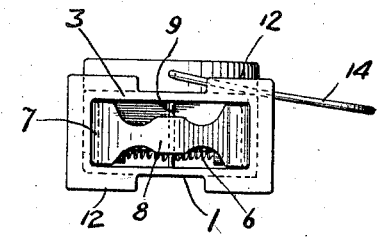
Figure 9:
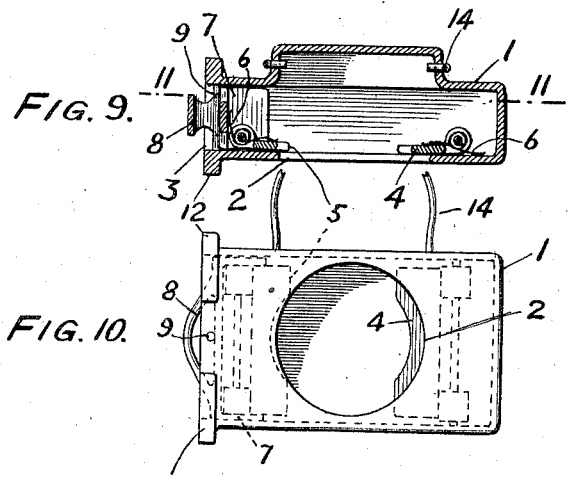
Figure 10:
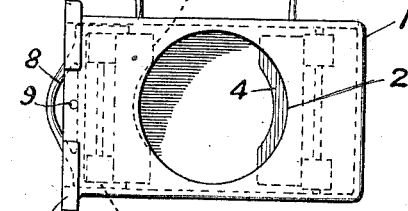
Figure 11:
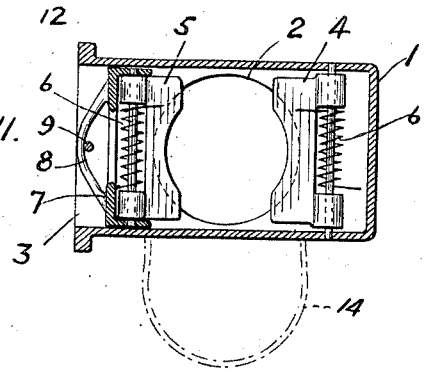

Figure 1, is a front view showing the milk bottle holder in application to a door as the locking means therefor and showing a milk bottle locked in the holder. Fig. 2, is an end view partly in section showing an empty milk bottle supported by the holder. Fig. 3, is a similar view showing a full milk bottle locked in the holder. Figs. 4, 5 and 6, are sectional views generally on the line 4—4, of Fig. 2, showing different positions of the parts. Fig. 7, is a front view of a cap or bracket. Fig. 8, is an end view of the housing of the holder. Fig. 9, is a sectional view of the housing. Fig. 10, is a plan view of the under side of the housing, and Fig. 11, is a sectional view on the line 11—11, of Fig. 9.

In the drawings 1, is a housing having an opening 2, for the reception of the flanged neck of a milk bottle and an opening 3, for a purpose to be presently described.

4 and 5, are pivotal jaws which by turning permit of the insertion of the neck of a milk bottle and then by turning in the opposite direction automatically hold the milk bottle with its top inside of and protected by the housing.

6, are springs which, when provided, insure the automatic operation of the jaws although the latter in some cases might operate all right by their weight.

One of the jaws 5, is pivotally connected with a carriage 7, slidable in the housing and adapted to be projected from the housing through the opening 3, as shown in Fig. 9, in order to cause the jaws to release the bottle neck and adapted to be confined within the housing in order to put the jaws into position for automatically locking the bottle neck. The loop 8, and pin 9, limit the range of movement of the carriage. Evidently a variety of means will suggest themselves to those skilled in the art for locking the carriage in position for causing the jaws to receive and automatically hold a bottle and for permitting the proper person to release the carriage to free the bottle. My invention is therefore not to be limited in that regard but I will describe a locking means especially adapted for use in connection with doors.

10, is a bracket that can be applied to a door jamb and it constitutes an obstruction cap or cover for the opening 3, and is also adapted to detachably receive the housing. The bracket has lips 11, between which a flange 12, on the housing is inserted when the door is more or less open, as shown in Figs. 5 and 6. When the door is closed the housing may not be removed from the part 10, because it is held therein by the door and by an end flange 13.

14, is a bail which can be used for holding an empty milk bottle.

The operation of the described embodiment of the invention is as follows: The door is open and the housing applied to the bracket cap 10, whereupon the door is closed. The carriage 7, is retained by the part 8, in its innermost position in the housing. The jaws 4 and 5, are in position to receive and grasp the neck of a bottle. The door prevents removal of the housing. The empty milk bottle may be hung on the bail 14. The milkman removes the empty bottle and pushes the neck of the full bottle into the housing which covers and protects its top and the jaws automatically grasp its neck and hold it in the housing. The customer opens the door and slides the housing clear of the part 10, thus permitting the carriage to slide into the position shown in Figs. 9 and 10, in which the jaws are sufficiently far apart to permit the ready removal of the bottle.

Modifications may be made in details without departing from the spirit of the invention.

What I claim is:

1. A milk bottle holder comprising the combination of a housing having an opening for the insertion and removal of a flanged bottle neck, pivotal jaws for receiving and automatically holding the bottle neck, a slidable member to which one of said jaws is pivoted, and means independent of the bottle for controlling the sliding movement of said member.

2. A milk bottle holder comprising the combination of a housing having an opening for the reception and removal of a bottle neck and having a second opening, pivotal bottle neck grasping jaws, a movable member to which one of said jaws is pivoted and which is projectable through the second opening, and a cap for engagement and disengagement in respect to the housing to obstruct and uncover the second opening and thereby lock and unlock the bottle.

3. A milk bottle holder comprising the combination of a housing having two openings, pivotal jaws of which one is slidable, a cap for covering and uncovering one of the openings to control the sliding movement of the slidable jaw, and a movable member for locking and unlocking the cap and housing in respect to each other.

In testimony whereof I have hereunto signed my name.

WILLIAM F. BEATON.

Witnesses:
CLIFFORD K. CASSEL,
K. M. GILLIGAN.

---

Copies of this patent may be obtained for five cents each, by addressing the "Commissioner of Patents, Washington, D. C."